United States Patent [19]
Higuchi et al.

[11] Patent Number: 6,051,097
[45] Date of Patent: Apr. 18, 2000

[54] AQUEOUS ADHESIVE COMPOSITION, AND BONDING PROCESS AND BONDED ARTICLE MAKING USE OF THE SAME

[75] Inventors: Koichi Higuchi; Mitsuo Asai, both of Annaka, Japan

[73] Assignee: Shin-Etsu Chemical Co., Ltd., Tokyo, Japan

[21] Appl. No.: 09/018,835

[22] Filed: Feb. 4, 1998

[30] Foreign Application Priority Data

Feb. 5, 1997 [JP] Japan ..................... 9-036984

[51] Int. Cl.$^7$ ........................ C09J 4/00
[52] U.S. Cl. ............ 156/329; 525/288; 524/547
[58] Field of Search ............. 524/547; 156/329; 525/288; 428/448

[56] References Cited

U.S. PATENT DOCUMENTS 4,721,750  1/1988  Nakamura et al. .............. 524/547
5,240,992  8/1993  Yamaya ........................ 524/547

FOREIGN PATENT DOCUMENTS 0 350 240  1/1990  European Pat. Off. .
0 505 115  9/1992  European Pat. Off. .

OTHER PUBLICATIONS

Chemical Abstracts, vol. 123, No. 16. Oct. 16, 1995 (Oct. 16, 1995) Columbus, Ohio, US; abstract No. 201286, XP002113830 *abstract* & JP 06 322219 (A Sekisui Chem. Co.).

*Primary Examiner*—John J. Gallagher
*Attorney, Agent, or Firm*—Oblon, Spivak, McClelland, Maier & Neustadt, P.C.

[57] ABSTRACT

An aqueous adhesive composition is provided which comprises a water-soluble condensation polymer obtained by subjecting a specific copolymer having an alkoxyl group and a specific alkoxysilane to hydrolysis-condensation, and an aqueous medium containing the condensation polymer. This composition can firmly bond non-sulfur-curable elastomer materials to various adherends such as metals; this has been hitherto difficult. A high-grade adhesion and superior heat resistance and oil resistance can be attained. No organic solvent is contained, promising an environmental safety.

19 Claims, No Drawings

AQUEOUS ADHESIVE COMPOSITION, AND BONDING PROCESS AND BONDED ARTICLE MAKING USE OF THE SAME

BACKGROUND OF THE INVENTION

1. Field of the Invention

This invention relates to an aqueous adhesive composition suited for the bonding of various adherends, in particular, elastomers.

2. Description of the Prior Art

It is desirable for adhesives or adhesive compositions to be able to bond various materials such as metals, glasses, plastics and elastomers one another, equally and firmly. However, especially in the case of elastomers, which are various and different in types depending on, e.g., how to cure, it is difficult to develop adhesives or adhesive compositions that can bond them to other adherends equally and firmly. Even though developed, they have problems from other aspects, e.g., environmental pollution. That is, among elastomers, most natural-rubber compositions, for example, are cured using various sulfur compounds.

Elastomers such as silicone rubbers, nitrile-butadiene rubbers and fluoroelastomers are cured using polyols or peroxides, and are called non-sulfur-curable types. These non-sulfur-curable elastomers are used in seals and gaskets as high-performance special elastomers endurable to sever conditions, and are industrially very useful materials. However, even if any adhesives or adhesive compositions that can effectively bond sulfur-curable elastomers are used to bond such non-sulfur-curable elastomers, they do not necessarily exhibit equal adhesive performance. This is because commonly the non-sulfur-curable elastomers can be bonded with difficulty, compared with sulfur-curable elastomers.

Meanwhile, U.S. Pat. No. 3,022,196 discloses an example of an adhesive composition developed for use in the bonding of peroxide-curable silicone rubbers which are non-sulfur-curable elastomers. This adhesive composition has superior adhesion, heat resistance and oil resistance, but is only soluble in organic solvents because it is comprised chiefly of a mixture of water-insoluble, vinyltriethoxysilane and γ-aminopropyltriethoxysilane (mixing ratio: about 5:1 in weight ratio). That is, this composition is of an organic type. Use of organic solvents, in particular, volatile solvents tends to cause environmental pollution.

Japanese Patent Publication (kokai) No.5-86335 discloses another example of an aqueous adhesive composition for use in peroxide-curable elastomers. This adhesive composition, though containing no organic solvent, is comprised chiefly of a mixture of an alkoxysilane and an unsaturated acid having corrosive properties. Hence, it has disadvantages that, when the peroxide-curable elastomers are bonded to adherends which tend to rust, such as iron and steel, bonded surfaces may corrode to attain no sufficient adhesion. Moreover, under the existing circumstances, this adhesive composition has not reached the level comparable to organic solvent type adhesive compositions in respect of adhesion to adherends, heat resistance and oil resistance.

SUMMARY OF THE INVENTION

The present invention was made taking account of circumstances as stated above. Accordingly, an object of the present invention is to provide an aqueous adhesive composition that is useful for bonding various adherends, in particular, can firmly bond non-sulfur-curable elastomers, and moreover has adhesion, heat resistance and oil resistance equivalent to organic solvent type adhesive compositions and an environmental safety; and a bonding process and a bonded article, carried out and obtained using such an adhesive composition.

To achieve the above object, the present invention provides an aqueous adhesive composition comprising:

a condensation polymer obtained by subjecting i) 100 parts by weight of a copolymer essentially consisting of from 99.5% by weight to 50% by weight of the following (A) monomer, from 0.5% by weight to 50% by weight of the following (B) monomer and from 0% by weight to 49.5% by weight of the following (C) monomer, ii) from 10 parts by weight to 200 parts by weight of the following (D) alkoxysilane and iii) from 0 part by weight to 100 parts by weight of the following (E) alkoxysilane to hydrolysis-condensation; and an aqueous medium, which contains said condensation polymer:

(A) an unsaturated monomer represented by the general formula (1):

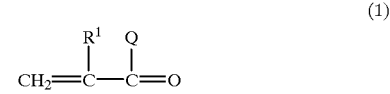

wherein $R^1$ is a hydrogen atom or a methyl group; and Q is $-OR^2$ or $-NR^3R^4$ where $R^2$ is a monovalent organic group containing at least one amino group or ammonium salt group, and $R^3$ and $R^4$ are each a hydrogen atom, an alkyl group having 1 to 6 carbon atoms, or a monovalent organic group containing at least one amino group or ammonium salt group;

(B) an alkoxysilane monomer represented by the general formula (2):

$$R^5Si(OR^6)_n(R^7)_{3-n} \qquad (2)$$

wherein $R^5$ is a monovalent organic group containing at least one polymerizable unsaturated carbon-carbon bond; $R^6$ is an alkyl group having 1 to 3 carbon atoms or an alkoxyalkyl group having 2 to 6 carbon atoms; $R^7$ is a hydrogen atom or an alkyl group having 1 to 3 carbon atoms; and n is an integer of 1 to 3;

(C) an ethylenically unsaturated monomer other than the foregoing components (A) and (B);

(D) an alkoxysilane represented by the general formula (3):

$$R^8Si(OR^9)_n(R^{10})_{3-n} \qquad (3)$$

wherein $R^8$ is a monovalent organic group containing at least one polymerizable unsaturated carbon-carbon bond; $R^9$ is an alkyl group having 1 to 3 carbon atoms or an alkoxyalkyl group having 2 to 6 carbon atoms; $R^{10}$ is a hydrogen atom or an alkyl group having 1 to 3 carbon atoms; and n is an integer of 1 to 3; and (E) an alkoxysilane represented by the general formula (4):

$$R^{11}Si(OR^{12})_n(R^{13})_{3-n} \qquad (4)$$

wherein $R^{11}$ stands for an amino group-containing alkyl group, epoxy group-containing alkyl group or an alkoxyl group having 1 to 3 carbon atoms, $R^{12}$ stands for an alkyl group having 1 to 3 carbon atoms, $R^{13}$ stands for a hydrogen atom or an alkyl group having 1 to 3 carbon atoms, and n is an integer of 1 to 3.

The present invention also provides a bonding process comprising the steps of applying the above adhesive composition to the interface between adherends, and subsequently applying heat and pressure to the whole to bond the adherends.

The present invention still also provides an elastomer-metal bonded article prepared by the above bonding process, using an elastomer and a metal as the adherends.

Since the adhesive composition of the present invention is aqueous, it has an environment safety and also can firmly bond various adherends such as metals, elastomers, glasses and plastics, in particular, non-sulfur-curable elastomers such as polyol-curable elastomers and peroxide-curable elastomers, and moreover it has adhesion, heat resistance and oil resistance equivalent to organic solvent type adhesive compositions. Accordingly, it can be effectively used to bond two different adherends, in particular, to bond elastomer adherends as exemplified by complicatedly hole-processed or groove-processed industrial rubber parts such as oil seals, gaskets, packings and valves, to metal adherends.

DESCRIPTION OF THE PREFERRED EMBODIMENTS

The present invention will be described below in detail. Materials used in the present invention will be described first.

Aqueous medium:

As the aqueous medium used in the present invention, water is optimum. However, for the purpose of improving the wettability of the adhesive composition to the adherends, an organic solvent compatible with water may be mixed in the water when used. Such an organic solvent may include methanol, ethanol, isopropanol, acetone, methyl ethyl ketone, dioxane, tetrahydrofuran, ethylene glycol, propylene glycol, glycerol, methylcarbitol, ethylcarbitol, methyl cellosolve, ethyl cellosolve, acetic acid, and acetates of the above alcohols. Any of these organic solvents may be used alone or in combination of two or more. The organic solvent may preferably be in a proportion of less than 50% by weight of the organic solvent-water mixture.

Component-(A) monomer:

As examples of the component-(A) unsaturated monomer represented by the general formula (1), used in the synthesis of the above copolymer, it may include acrylamide, methacrylamide, N,N-dimethylacrylamide, N,N-dimethylmethacrylamide, N-isopropylacrylamide, N-isopropylmethacrylamide, N,N-diethylacrylamide, N,N-diethylmethacrylamide, N,N-dimethylaminopropylacrylamide, N,N-dimethylaminopropylmethacrylamide, N,N-dimethylaminoethyl acrylate, acryloymorpholine, and quaternary ammonium salts comprising any of these to which an alkyl halide has been added. Any of these may be used alone or in combination of two or more. Of these examples, N,N-dimethylacrylamide, N,N-dimethylmethacrylamide, N,N-diethylacrylamide and N,N-diethylmethacrylamide are preferred in view of a good adhesion of the resultant adhesive composition.

The component-(A) unsaturated monomer used in polymerization may be in an amount of from 99.5 to 50% by weight, and preferably from 75 to 60% by weight, based on the total weight of the monomers (A), (B) and (C). If the component-(A) unsaturated monomer is present in an amount less than 50% by weight, the resultant composition may have low water-solubility and adhesion. If it is present in an amount more than 99.5% by weight, the composition may have an insufficient adhesion.

Component-(B) monomer:

As examples of the component-(B) alkoxysilane monomer represented by the general formula (2), used in the synthesis of the above copolymer, it may include vinyltrimethoxysilane, vinyltriethoxysilane, vinyltri(methoxyethoxy)silane, vinylmethyldimethoxysilane, allyltrimethoxysilane, allyltriethoxysilane, γ-acryloyloxypropyltrimethoxysilane, γ-acryloyloxypropyltriethoxysilane, γ-acryloyloxypropylmethyldimethoxysilane, γ-acryloyloxypropylmethyldiethoxysilane, γ-methacryloyloxypropyltrimethoxysilane, γ-methacryloyloxypropyltriethoxysilane, γ-methacryloyloxypropylmethyldimethoxysilane and γ-methacryloyloxypropylmethyldiethoxysilane. Any of these may be used alone or in combination of two or more. Of these examples, vinyltrimethoxysilane, γ-acryloyloxypropyltrimethoxysilane and γ-methacryloyloxypropyltrimethoxysilane are preferred in view of a good adhesion of the resultant adhesive composition.

The component-(B) alkoxysilane monomer used in polymerization may be in an amount of from 0.5 to 50% by weight, and preferably from 3 to 30% by weight, based on the total weight of the monomers (A), (B) and (C). If the component-(B) alkoxysilane monomer is present in an amount less than 0.5% by weight, like the above component-(A) unsaturated monomer, the resultant composition may have an insufficient adhesion. If it is present in an amount more than 50% by weight, the composition may have a low water-solubility.

Component-(C) monomer:

As examples of the component-(C) ethylenically unsaturated monomer other than the above monomers (A) and (B), used in the synthesis of the above copolymer, it may include vinyl acetate, alkyl acrylates, alkyl methacrylates, styrene, acrylonitrile, methacrylonitrile, acrylic acid, methacrylic acid, 2-hydroxyethyl acrylate and 2-hydroxyethyl methacrylate. Any of these may be used alone or in combination of two or more. Of these examples, acrylic acid and methacrylic acid are preferred in view of a good copolymerizability and good water-solubility of the resultant composition.

The component-(C) ethylenically unsaturated monomer used in polymerization may be in an amount of from 49.5 to 0% by weight, and preferably from 35 to 0% by weight, based on the total weight of the monomers (A), (B) and (C).

Component-(D) alkoxysilane:

As examples of the component-(D) alkoxysilane represented by the general formula (3), subjected to hydrolysis-condensation together with the above copolymer, it may include vinyltrimethoxysilane, vinyltriethoxysilane, vinyltri(methoxyethoxy)silane, vinylmethyldimethoxysilane, allyltrimethoxysilane, allyltriethoxysilane, γ-acryloyloxypropyltrimethoxysilane, γ-acryloyloxypropyltriethoxysilane, γ-acryloyloxypropylmethyldimethoxysilane, γ-acryloyloxypropylmethyldiethoxysilane, γ-methacryloyloxypropyltrimethoxysilane, γ-methacryloyloxypropyltriethoxysilane, γ-methacryloyloxypropylmethyldimethoxysilane and γ-methacryloyloxypropylmethyldiethoxysilane. Any of these may be used alone or in combination of two or more. Of these examples, vinyltrimethoxysilane, γ-acryloyloxypropyltrimethoxysilane and γ-methacryloyloxypropyltrimethoxysilane are preferred in view of a good adhesion of the resultant adhesive composition.

Component-(E) alkoxysilane:

Specific examples of the alkoxysilane of the component (E) having the general formula (4) which is subjected to hrdrolysis-condensation together with said copolymer include γ-aminopropyltrimethoxysilane, γ-aminopropylmethyldimethoxysilane, γ-aminopropyltriethoxysilane, N- (β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, β-(3,4-epoxycyclohexyl) ethyltrimethoxysilane, β-(3,4-epoxycyclohexyl) ethylmethyldimethoxysilane, β-(3,4-epoxycyclohexyl) ethyltriethoxysilane, γ-glycidoxypropyltrimethoxysilane, γ-glycidoxypropylmethyldimethoxysilane, γ-glycidoxypropyltriethoxysilane, γ-glycidoxypropylmethyldiethoxysilane, tetramethoxysilane, tetraethoxysilane, tetrapropoxysilane, trimethoxysilane, triethoxysilane, methyltrimethoxysilane, and methyltriethoxysilane. These compounds may be used singly or in combination of two or more. Out of the compounds exemplified above, preferred are γ-aminopropyltrimethoxysilane, N-(β-aminoethyl)-γ-aminopropyltrimethoxysilane, γ-glycidoxypropyltrimethoxysilane, tetramethoxysilane and tetraethoxysilane because the adhesive composition exhibits good adhesion.

How to produce the copolymer and condensation polymer by using the monomers (A), (B), (C), (D) and (E) described above will be described below.

Production of copolymer:

To produce the copolymer by using the monomers (A), (B) and (C), a polymerization initiator is added to a medium, and then a mixture of these monomers in the stated quantities is dropwise added at 60 to 90° C. over a period of 1 to 5 hours to carry out polymerization. If necessary, a chain transfer agent such as dodecyl mercaptan is previously added in order to control molecular weight.

As the medium used in the polymerization, water is not necessarily required and an organic solvent may be used. Such an organic solvent may include methanol, ethanol, isopropanol, acetone, methyl ethyl ketone, dioxane, tetrahydrofuran, ethylene glycol, propylene glycol, glycerol, methylcarbitol, ethylcarbitol, methyl cellosolve, ethyl cellosolve, acetic acid, and acetates of the above alcohols. Any of these organic solvents may be used alone or in combination of two or more.

The polymerization initiator may include, e.g., radical polymerization initiators such as azobisisobutylonitrile, benzoyl peroxide, 2,2-azobisaminodipropanoates, ammonium peroxide and potassium peroxide.

Production of condensation polymer:

To produce the condensation polymer by using the copolymer thus obtained, this copolymer, the component-(D) alkoxysilane and the component-(E) alkoxysilane are subjected to hydrolysis-condensation reaction. Stated specifically, after the copolymer has been produced, the component- (D) alkoxysilane, the component-(E) alkoxysilane and water are added to the copolymer to carry out reaction at room temperature to 80° C. for 2 to 5 hours. The component-(D) alkoxysilane may be used in an amount of 10 to 200 parts by weight, and preferably 20 to 150 parts by weight, based on 100 parts by weight of the copolymer. If the component-(D) alkoxysilane is present in an amount less than 10 parts by weight, the resultant adhesive composition may have an insufficient adhesion. If it is present in an amount more than 200 parts by weight, the composition tends to cause gelation. In this step, the alkoxyl groups of the component- (D) alkoxysilane and the component- (E) alkoxysilane and the alkoxyl groups of the copolymer cause hydrolysis to form silanol groups. As soon as the silanol groups are formed, the silanol groups mutually undergo condensation to form the condensation polymer.

The component-(E) alkoxysilane needs to be used in an amount of 0 to 100 parts by weight, preferably 0 to 80 parts by weight per 100 parts by weight of said copolymer. The amount of the alkoxysilane of the component-(E) exceeds 100 parts by weight, adhesion obtained is insufficient and gelation of the composition is caused.

The water necessary for this hydrolysis-condensation reaction may preferably be used in an amount ranging from 0.2 to 0.9 time the amount of all of the alkoxyl groups in the copolymer, component-(D) alkoxysilane, and component-(E) alkoxysilane in mole. If this water is present in too large a quantity, the reaction mixture tends to gel during the reaction, making it difficult to control the reaction in some cases. If it is present in too small a quantity, the resultant composition may have a low water-solubility. A hydrolysis catalyst may also be used as an optional component in this reaction. The hydrolysis catalyst may include acid compounds such as acetic acid, hydrochloric acid, formic acid, propionic acid and nitric acid; metal compounds such as tetrabutyl titanate, dibutyltin dilaurate and acetylacetonatoaluminum; and fluorine compounds such as potassium fluoride and tetrabutylammonium fluoride. When such a hydrolysis catalyst is used, it may be used in an amount ranging usually from about 0.0005 to 30 parts by weight, and preferably from about 0.005 to 10 parts by weight, based on 100 parts by weight of the total of the copolymer, component-(D) alkoxysilane and component-(E) alkoxysilane.

The condensation polymer thus obtained exhibits a good water-solubility. Accordingly, this condensation polymer may be dissolved in the aqueous medium as described above, in an appropriate concentration to obtain the aqueous adhesive composition of the present invention.

Other components contained:

To the adhesive composition of the present invention, known additives such as a plasticizer, a filler, a pigment, a reinforcing agent, a film-forming auxiliary, an anti-foaming agent and an anti-thickening agent may be added so long as the object and effect of the present invention are not damaged. Any of these may be added alone or in combination of two or more. The additives may typically include titanium dioxide, carbon black, zinc oxide, butyl cellosolve, butyl carbitol and butyl cellosolve acetate.

Bonding process:

In the bonding process of the present invention, first the above aqueous adhesive composition is applied on at least one of the same type or different types of articles to be bonded each other (adherends) or, if necessary, it is diluted with water or an aqueous mixed solvent of water and an organic solvent compatible with the water and then the dilute coating solution is coated, followed by drying. In the latter case, the coating solution may suitably be in a concentration (content of all effective components) ranging usually from about 1 to 25% by weight, and preferably from about 2 to 15% by weight. The composition or coating solution may be coated by any conventional coating process such as spraying, dipping, brushing or wiping. After coating, the drying is carried out at a temperature ranging usually from room temperature to 150° C.

Next, one adherend thus coated is superposed on the other adherend, and the adherends thus superposed are heated under application of a pressure. Conditions for the pressing and heating may differ depending on the type and thickness of adherends and, when unvulcanized elastomers are used as adherends, on the rate of curing. For example, in the case when the two adherends are a metal and an unvulcanized elastomer, a pressure ranging usually from about 20 to 170 megapascals (MPa), and preferably from 20 to 50 MPa, is applied to the both surfaces (the interface) of the superposed metal and elastomer adherends, and simultaneously the superposed adherends are heated to a temperature of from 100 to 300° C., and preferably from 150 to 170° C. The time for this pressing and heating may differ depending on the curing rate and thickness of elastomers in the case of these adherends, and may usually be 3 to 60 minutes. Thus, an elastomer-metal bonded composite is obtained.

The adherends to be bonded by the process of the present invention may include elastomers, glasses, cloths, plastics and metals. The two adherends to be bonded may be the same or different materials, where the composition of the present invention can exhibit good adhesive properties and can be characterized in that it is effective also for the combination of elastomers, in particular, non-sulfur-curable type polyol-curable or peroxide-curable elastomers with metallic materials such as iron, steel (inclusive of stainless steel), lead, aluminum, copper, brass, bronze, nickel and zinc. Such combination has been hitherto difficult. The non-sulfur-curable elastomers may include natural rubbers, olefin type synthetic rubbers such as polychloroprenes, polybutadienes, neoprenes, butyl rubbers, butyl bromide rubbers, nitrile rubbers and nitrile-butadiene rubbers, silicone rubbers, and fluoroelastomers. In particular, the present invention is effective for polyol-curable or peroxide-curable elastomers such as nitrile-butadiene rubbers, silicone rubbers and fluoroelastomers.

EXAMPLES

The present invention will be described below in greater detail by giving Examples and Comparative Examples.

First, peroxide-curable elastomers of the following Compounding Examples were prepared by conventional methods. In these Examples, "part(s)" is "part(s) by weight" in all occurrences.

Compounding Example 1

| | |
|---|---|
| Silicone rubber (KE555U, available from Shin-Etsu Chemical Co., Ltd.) | 100 parts |
| Dicumyl peroxide | 0.6 part |

Compounding Example 2

| | |
|---|---|
| Fluorosilicone rubber (FE2611U, available from Shin-Etsu Chemical Co., Ltd.) | 100 parts |
| Dicumyl peroxide | 0.6 part |

Compounding Example 3

| | |
|---|---|
| Nitrile-butadiene rubber (NIPOLE DN302, available from Nippon Zeon Co., Ltd.) | 100 parts |
| FEF carbon black | 60 parts |
| Zinc white | 5 parts |
| Stearic acid | 1 part |
| 2,2,4-Trimethyl-1,2-dihydroquinone | 1 part |
| Dioctyl phthalate | 5 parts |
| Triallyl isocyanurate | 0.8 part |
| 1,3-bis(t-Butylperoxyisopropyl)benzene | 6 parts |

Examples 1 to 11, Comparative Examples 1 to 3

In each Example, 100 g of isopropanol and 1.0 g of azobisisobutyronitrile as a polymerization initiator were charged in a four-necked flask having a stirrer and a reflux condenser. To these, a mixture of the monomers (A), (B) and (C) as shown in Tables 1–4 below was dropwise added over a period of 2 hours. Subsequently, the contents were aged for 2 hours at the reflux temperature. After cooling, the component-(D) alkoxysilane, the component-(E) alkoxysilane, deionized water and catalyst as shown in Tables 1–4 were added in the amount also shown in Tables 1–4 ["part(s)" is "part(s) by weight" in all occurrences], and the contents were stirred at 50° C. for 2 hours, followed by cooling to obtain adhesive compositions.

TABLE 1

| | | | Example | | | |
|---|---|---|---|---|---|---|
| | | | 1 | 2 | 3 | 4 |
| Ma-te-ri-als | A | N,N-dimethylacrylamide: (parts) | 50 | 40 | 35 | 35 |
| | B | γ-Methacryloyloxy-propyltrimethoxysilane: (parts) | 5 | 5 | 10 | 10 |
| | C | Methyl methacrylate: (parts) | — | 10 | — | — |
| | | Butyl acrylate: (parts) | — | — | 10 | — |
| | | Methacrylic acid: (parts) | — | — | — | 5 |
| | | Styrene: (parts) | — | — | — | 5 |
| | D | γ-Methacryloyloxy-propyltrimethoxy-silane: (parts) | 22.5 | 17.5 | 17.5 | 17.5 |
| | | Deionized water: (parts) | 3.5 | 3 | 3 | 3 |
| | | Catalyst: (part) | acetic acid 0.5 | acetic acid 0.5 | acetic acid 0.5 | acetic acid 0.5 |

TABLE 2

| | | | Example | | | |
|---|---|---|---|---|---|---|
| | | | 5 | 6 | 7 | 8 |
| Ma-te-ri-als | A | N,N-dimethyl-acrylamide: (parts) | — | 50 | 25 | 50 |
| | | N,N-dimethyl-aminopropyl-acrylamide: (parts) | 50 | — | 15 | — |
| | B | γ-Methacryloyloxy-propyltri-methoxysilane: (parts) | 5 | — | — | 5 |
| | | Vinyltrimethoxy-silane: (parts) | — | 5 | 5 | — |
| | C | Butyl acrylate: (parts) | — | — | 10 | — |

TABLE 2-continued

|  |  |  | Example | | | |
|---|---|---|---|---|---|---|
|  |  |  | 5 | 6 | 7 | 8 |
|  | D | γ-Methacryloyloxy-propyl-trimethoxysilane: (parts) | 10 | — | 17 | 17.5 |
|  |  | Vinyltrimethoxy-silane: (parts) | 7 | 10 | — | — |
| Deionized water: (parts) | | | 3 | 2.5 | 1.2 | 2.2 |
| Catalyst: (part) | | | acetic acid 0.5 | acetic acid 0.5 | tetra-butyl titanate 0.01 | potassium fluoride 0.01 |

TABLE 3

|  |  |  | Example | | |
|---|---|---|---|---|---|
|  |  |  | 9 | 10 | 11 |
| Materials | A | N-isopropylacrylamide: (parts) | 50 | — | — |
|  |  | N,N-dimethylaminoethyl acrylate: (parts) | — | 40 | — |
|  |  | Acryloylmorpholine | — | — | 45 |
|  | B | γ-Methacryloyloxypropyl-trimethoxysilane: (parts) | 5 | 5 | 5 |
|  | C | Butyl acrylate: (parts) | — | 10 | 5 |
|  | D | γ-Methacryloyloxypropyl-trimethoxysilane: (parts) | 20 | 16 | 11 |
|  | E | N-(β-Aminoethyl)-γ-aminopropyltrimethoxy-silane: (parts) | 2 | — | — |
|  |  | γ-Glycidoxypropyl-trimethoxysilane: (parts) | — | 6 | — |
|  |  | Tetramethoxysilane: (parts) | — | — | 11 |
| Deionized water: (parts) | | | 3 | 3.5 | 3.5 |
| Catalyst: (part) | | | phosphoric acid 0.5 | potassium fluoride 0.01 | acetic acid 0.5 |

TABLE 4

|  |  |  | Comparative Example | | |
|---|---|---|---|---|---|
|  |  |  | 1 | 2 | 3 |
| Materials | A | N,N-dimethylacrylamide: (parts) | 25 | 50 | 50 |
|  | B | γ-Methacryloyloxypropyl-trimethoxysilane: (parts) | 5 | 5 | 22 |
|  | C | Methyl methacrylate: (parts) | 25 | — | — |
|  | D | γ-Methacryloyloxypropyl-trimethoxysilane: (parts) | 17.5 | 5 | — |
| Deionized water: (parts) | | | 3 | 1.6 | 3 |
| Catalyst: (parts) | | | acetic acid 0.5 | acetic acid 0.5 | acetic acid 0.5 |

The products of these examples, thus obtained, were each diluted with deionized water to 1/10 to evaluate their water-solubility. An instance where the product completely dissolved is indicated as "O"; an instance where the solution became slightly turbid, as "Δ"; and an instance where insoluble precipitates occurred, as "X". Results of these are shown in Table 5.

Aqueous 10% solutions of the adhesive compositions were each brush-coated on a soft steel sheet having been sandblasted, followed by drying at 105° C. for 10 minutes. Unvulcanized elastomer sheets of 3 mm thick according to Compounding Examples 1 to 3 were each superposed thereon, followed by vulcanization under pressure at 165° C. for 10 minutes. The resultant bonded composites were immediately put to a 90° C. peel test according to JIS K-6301. After the bonding, the bonded composites were left for 2 days under conditions of 200° C., and thereafter put to the same peel test as the above to evaluate heat-resistance adhesive properties. Results of these are shown in Table 5.

TABLE 5

|  |  | Example | | | | | | | | | | | Comparative Example | | |
|---|---|---|---|---|---|---|---|---|---|---|---|---|---|---|---|
|  |  | 1 | 2 | 3 | 4 | 5 | 6 | 7 | 8 | 9 | 10 | 11 | 1 | 2 | 3 |
| Water-solubility | | O | O | Δ | Δ | O | O | O | O | O | O | O | X | O | Δ |
| Compounding Example 1 | Immediately after bonding: Rubber-remaining area: (%) | 100 | 100 | 100 | 100 | 100 | 95 | 100 | 100 | 100 | 100 | 100 | — | 80 | 0 |
|  | After heating for 2 days: Rubber-remaining area: (%) | 100 | 100 | 100 | 95 | 100 | 85 | 80 | 100 | 100 | 100 | 100 | — | 0 | 0 |
| Compounding Example 2 | Immediately after bonding: Rubber-remaining area: (%) | 100 | 100 | 90 | 95 | 100 | 95 | 100 | 100 | 100 | 100 | 100 | — | 70 | 0 |
|  | After heating for 2 days: Rubber-remaining area: (%) | 95 | 90 | 60 | 65 | 95 | 45 | 80 | 90 | 100 | 95 | 95 | — | 0 | 0 |

TABLE 5-continued

|  |  | Example | | | | | | | | | | | Comparative Example | | |
|---|---|---|---|---|---|---|---|---|---|---|---|---|---|---|---|
|  |  | 1 | 2 | 3 | 4 | 5 | 6 | 7 | 8 | 9 | 10 | 11 | 1 | 2 | 3 |
| Compounding Example 3 | Immediately after bonding: Rubber-remaining area: (%) | 100 | 100 | 100 | 100 | 100 | 95 | 100 | 100 | 100 | 100 | 100 | — | 90 | 0 |
|  | After heating for 2 days: Rubber-remaining area: (%) | 100 | 95 | 100 | 90 | 100 | 85 | 80 | 100 | 100 | 100 | 95 | — | 0 | 0 |

What is claimed is:

1. An aqueous adhesive composition comprising:

a condensation polymer obtained by subjecting i) 100 parts by weight of a copolymer essentially consisting of from 99.5% by weight to 50% by weight of the following (A) monomer, from 0.5% by weight to 50% by weight of the following (B) monomer and from (0% by weight to 49.5% by weight of the following (C) monomer, ii) from 10 parts by weight to 200 parts by weight of the following (D) alkoxysilane and iii) from 0 part by weight to 100 parts by weight of the following (E) alkoxysilane to hydrolysis-condensation, and an aqueous medium, which contains said condensation polymer:

(A) An unsaturated monomer represented by the general formula (1):

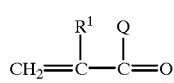

wherein $R^1$ is a hydrogen atom or a methyl group; and Q is $-OR^2$ or $-NR^3R^4$ where $R^2$ is a monovalent organic group containing at least one amino group or ammonium salt group, and $R^3$ and $R^4$ are each a hydrogen atom, an alkyl group having 1 to 6 carbon atoms, or a monovalent organic group containing at least one amino group or ammonium salt group;

(B) an alkoxysilane monomer represented by the general formula (2):

$$R^5Si(OR^6)_n(R^7)_{3-n} \qquad (2)$$

wherein $R^5$ is a monovalent organic group containing at least one polymerizable unsaturated carbon-carbon bond; $R^6$ is an alkyl group having 1 to 3 carbon atoms or an alkoxyalkyl group having 2 to 6 carbon atoms; $R^7$ is a hydrogen atom or an alkyl group having 1 to 3 carbon atoms; and n is an integer of 1 to 3;

(C) an ethylenically unsaturated monomer other than the foregoing components (A) and (B);

(D) an alkoxysilane represented by the general formula (3):

$$R^8Si(OR^9)_n(R^{10})_{3-n} \qquad (3)$$

wherein $R^8$ is a monovalent organic group containing at least one polymerizable unsaturated carbon-carbon bond; $R^9$ is an alkyl group having 1 to 3 carbon atoms or an alkoxyalkyl group having 2 to 6 carbon atoms; $R^{10}$ is a hydrogen atom or an alkyl group having 1 to 3 carbon atoms; and n is an integer of 1 to 3; and (E) an alkoxysilane represented by the general formula (4):

$$R^{11}Si(OR^{12})_n(R^{13})_{3-n} \qquad (4)$$

wherein $R^{11}$ stands for an amino group-containing alkyl group, epoxy group-containing alkyl group or an alkoxyl group having 1 to 3 carbon atoms, $R^{12}$ stands for an alkyl group having 1 to 3 carbon atoms, $R^{13}$ stands for a hydrogen atom or an alkyl group having 1 to 3 carbon atoms, and n is an integer of 1 to 3.

2. The composition of claim 1, wherein said aqueous medium is water; or a mixed solvent of water and an organic solvent compatible with water, containing the organic solvent in an amount less than 50% by weight.

3. The composition of claim 1, wherein the component-(A) monomer is selected from the group consisting of acrylamide, methacrylamide, N,N-dimethylacrylamide, N,N-dimethylmethacrylamide, N-isopropylacrylamide, N-isopropylmethacrylamide, N,N-diethylacrylamide, N,N-diethylmethacrylamide, N,N-dimethylaminopropylacrylamide, N,N-dimethylaminopropylmethacrylamide, N,N-dimethylaminoethyl acrylate, acryloylmorpholine, and a quaternary ammonium salt comprising any of these to which an alkyl halide has been added.

4. The composition of claim 2, wherein the component-(A) monomer is at least one of N,N-dimethylacrylamide, N,N-dimethylmethacrylamide, N,N-diethylacrylamide and N,N-diethylmethacrylamide.

5. The composition of claim 1, wherein the component-(A) monomer is present in an amount of from 95% by weight to 60% by weight based on the total weight of the monomers (A), (B) and (C).

6. The composition of claim 1, wherein the component-(B) monomer is selected from the group consisting of vinyltrimethoxysilane, vinyltriethoxysilane, vinyltri(methoxyethoxy)silane, vinylmethyldimethoxysilane, allyltrimethoxysilane, allyltriethoxysilane, γ-acryloyloxypropyltrimethoxysilane, γ-acryloyloxypropyltriethoxysilane, γ-acryloyloxypropylmethyldimethoxysilane, γ-acryloyloxypropylmethyldiethoxysilane, γ-methacryloyloxypropyltrimethoxysilane, γ-methacryloyloxypropyltriethoxysilane, γ-methacryloyloxypropylmethyldimethoxysilane and γ-methacryloyloxypropylmethyldiethoxysilane.

7. The composition of claim 1, wherein the component-(B) monomer is selected from the group consisting of vinyltrimethoxysilane, γ-acryloyloxypropyltrimethoxysilane and γ-methacryloyloxypropyltrimethoxysilane.

8. The composition of claim 1, wherein the component-(B) monomer is present in an amount of from 3% by weight to 30% by weight based on the total weight of the monomers (A), (B) and (C).

9. The composition of claim 1, wherein the component-(C) monomer is selected from the group consisting of vinyl acetate, an alkyl acrylate, an alkyl methacrylate, styrene, acrylonitrile, methacrylonitrile, acrylic acid, methacrylic acid, 2-hydroxyethyl acrylate and 2-hydroxyethyl methacrylate.

10. The composition of claim 1, wherein the component-(C) monomer is present in an amount of from 35% by weight to 0% by weight based on the total weight of the monomers (A), (B) and (C).

11. The composition of claim 1, wherein the component-(D) monomer is selected from the group consisting of vinyltrimethoxysilane, vinyltriethoxysilane, vinyltri(methoxyethoxy)silane, vinylmethyldimethoxysilane, allyltrimethoxysilane, allyltriethoxysilane, γ-acryloyloxypropyltrimethoxysilane, γ-acryloyloxypropyltriethoxysilane, γ-acryloyloxypropylmethyldimethoxysilane, γ-acryloyloxypropylmethyldiethoxysilane, γ-methacryloyloxypropyltrimethoxysilane, γ-methacryloyloxypropyltriethoxysilane, γ-methacryloyloxypropylmethyldimethoxysilane and γ-methacryloyloxypropylmethyldiethoxysilane.

12. The composition of claim 1, wherein the component-(E) monomer is selected from the group consisting of γ-aminopropyltrimethoxysilane, N-(β-aminoehyl)-γ-aminopropyltrimethoxysilane, γ-glycidoxypropyltrimethoxysilane, tetramethoxysilane and tetraethoxysilane.

13. The composition of claim 1, wherein said copolymer is obtained by polymerizing the monomers (A) and (B) and optionally the monomer (C) in an organic solvent in the presence of a radical polymerization initiator.

14. The composition of claim 1, wherein said condensation polymer is obtained by allowing 100 parts by weight of the copolymer to react with from 20 parts by weight to 150 parts by weight of the monomer (D) and 0 part by weight to 80 parts by weight of the monomer (E).

15. The composition of claim 1, wherein said hydrolysis-condensation is carried out using water in an amount which is from 0.2 to 0.9 time the amount of all the alkoxyl groups of the copolymer, component-(D) alkoxysilane, and component-(E) alkoxysilane in mole.

16. A bonding process comprising the steps of;
   applying the adhesive composition according to claim 1 to the interface between two adherends to be superposed face to face, and;
   subsequently applying heat and pressure to the whole of the adherends superposed, to bond the adherends to obtain a bonded composite.

17. The process of claim 16, wherein one of the adherends is an unvulcanized elastomer and the other adherend is a metal.

18. An aqueous adhesive composition according to claim 1 in which component (A) is dimethylacrylamide in the amount of 40 parts by weight, component (B) is γ-methacryloyloxypropyltrimethoxysilane in the amount of 5 parts by weight, component (C) is methyl methacrylate in the amount of 10 parts by weight and component (D) is γ-methacryloyloxysilane in the amount of 17.5 parts by weight, the copolymer consists of copolymerized (A), (B) and (C), and the condensation polymer consisting of the hydrolysis-condensation product of copolymer (i) and component (D).

19. The aqueous adhesive composition of claim 1, wherein said condensation polymer is water-soluble.

* * * * *